United States Patent [19]
Nishino et al.

[11] 3,855,914
[45] Dec. 24, 1974

[54] APPARATUS FOR PRODUCING MINERAL WATER

[75] Inventors: Atsushi Nishino; Hiroshi Kumano; Yukihide Iura, all of Osaka, Japan

[73] Assignee: Matsushita Electric Industrial Company Limited, Osaka, Japan

[22] Filed: Oct. 17, 1972

[21] Appl. No.: 298,446

[30] Foreign Application Priority Data
Dec. 1, 1971  Japan.............................. 46-97049

[52] U.S. Cl.................................. 99/275, 426/477
[51] Int. Cl............................................. A23l 1/00
[58] Field of Search ....... 99/275, 276, 277.1, 277.2; 426/477, 474, 67

[56] References Cited
UNITED STATES PATENTS

| | | | |
|---|---|---|---|
| 1,645,320 | 10/1927 | Armond | 99/275 |
| 2,870,016 | 1/1959 | Day | 99/275 |
| 3,256,802 | 6/1966 | Karr | 99/275 |
| 3,393,631 | 7/1968 | Harrison | 99/275 |
| 3,472,425 | 10/1969 | Booth | 426/477 |
| 3,780,198 | 12/1973 | Pahl | 99/275 |

Primary Examiner—Robert W. Jenkins

[57] ABSTRACT

A method of producing mineral water comprising preparing source water, dissolving carbonic acid gas in the source water under a pressure preferably higher than the normal pressure so as to carbonate the source water, and dissolving at least one kind of water-insoluble mineral compound such as a mineral carbonate in the carbonated water whereby the carbonated source water changes to mineral water. An apparatus of producing mineral water comprising means for supplying source water, means for dissolving carbonic acid gas in the source water under a pressure preferably higher than the normal pressure so as to carbonate the source water, means for dissolving at least one kind of mineral compound such as a mineral carbonate in the carbonated water.

4 Claims, 6 Drawing Figures

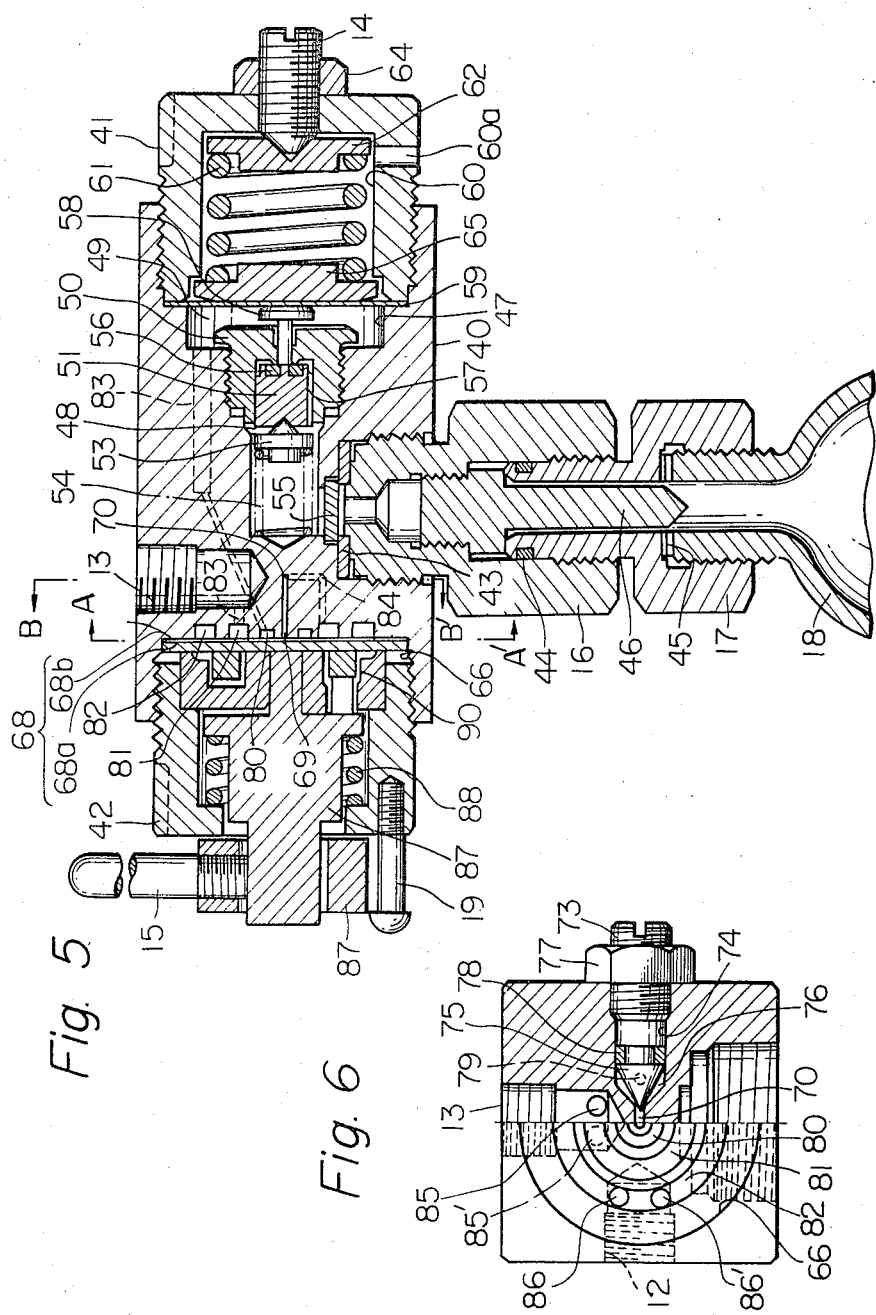

APPARATUS FOR PRODUCING MINERAL WATER

The present invention relates to an apparatus for producing mineral water and more particularly to an improved apparatus for producing mineral water having a composition similar to that of spring water.

Various methods for artificially producing mineral water by using service water or the like have been developed. One of the methods includes dissolving in source water to be treated one or more water-soluble salts such as acid calcium phosphate ($CaH(PO_4)2 \cdot H_2O$), magneseium sulphate ($MgSO_4 \cdot 7H_2O$), natrium chloride (NaCl), calcium chloride ($CaCl_2$), natrium bicarbonate ($NaHCO_3$), etc. Although the method is useful for continuously producing large quantities of mineral water, it is inappropriate to intermittently produce small quantities of mineral water. Furthermore, it should be noted that the resultant water is permanent hard water containing anions such as $SO_4^{--}$, $Cl^-$ and $PO_4^{---}$, which anions should be usually removed from the potable water. It is, on the other hand, known that the spring water is a temporary hard water containing bicarbonate ($HCO_3^-$) ions.

Another method usually carried out by a conventional water purifier for household use or small-scale use merely includes passing source water through a filtration layer containing calcium carbonate ($CaCO_3$) and active carbon. Although this method is effective for removing residual chlorine and, visible and invisible suspended matter from the source water, it is ineffective for producing mineral water containing a sufficient amount of mineral components since calcium carbonate is hardly dissolved in water. It is known in the art that calcite dissolves in water to such a small rate of from 10 to 20 ppm and aragonite dissolves in water to a rate of 30 to 40 ppm even if flowing water at a rate of about 1 (liter/minute) is used.

It is therefore a primary object of the invention to provide an apparatus for producing mineral water having a composition essentially the same as the spring water.

It is another object to provide an apparatus for producing mineral water, which is favourably employed for household or small-scale use as well as for large-scale use.

Other and many of the attendant advantages of the present invention will become readily apparent to those skilled in the art as an understanding thereof is obtained by reference to the following description when considered in connection with the accompanying drawings, wherein:

FIG. 5 is a longitudinal sectional view of the device of FIG. 3.

FIG. 6 is a cross-sectional view of the device of FIG. 3, wherein left-hand and right-hand portions are respectively taken along lines A—A' and B—B' shown in FIG. 5.

Briefly described, one embodiment of the invention comprises preparing a kind of source water, dissolving carbondioxide ($CO_2$) in the prepared source water under a pressure preferably higher than the normal pressure so as to carbonate the source water to a desired degree, and passing the carbonated water through a layer containing one or more mineral components which are water-insoluble but soluble in acid, so that mineral water sufficiently containing the mineral components is obtained since the mineral components are dissolved in the carbonated water through neutralization.

Figure 1:
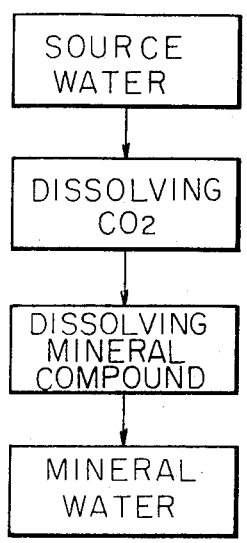
FIGS. 1 and 2 are block diagrams illustrating preferred methods according to the invention.

Referring now to the drawings, and more specifically to FIG. 1 there is shown sequential steps of a preferred method according to the invention. As shown, there is prepared a kind of source water, for example, usual service water, softened water, distilled water, water treated by cation exchanger, etc. The source water is then mixed with carbonic acid gas under a predetermined pressure which is preferably slightly larger than the normal pressure, that is about 1.0 kg/cm², so that carbonated water is produced since the water reacts with the carbonic acid gas through the following reaction:

$$CO_2 + H_2O \rightarrow H_2CO_3 \qquad (1)$$

It should be understood that the above reaction (1) preferably proceeds under the high pressure since the carbonic acid gas rapidly and sufficiently dissolves in water under such high pressure. The resultant carbonated water is then mixed with one or more water insoluble mineral compounds each containing a mineral component and being soluble in acid, so that the mineral components of the mineral compounds dissolve in the carbonated water which then becomes mineral water. The carbonated water is, for example, mixed with the mineral compounds through filtration by a filter medium containing the mineral compounds. The filter medium preferably mainly comprises calcium carbonate and may further contain a trace of magnesium carbonate. The filter medium may further contain some other mineral compounds soluble in acid and containing Fe, Mn, K, and Ni. Pegmatite can be used for the mineral compound. Carbonates, for example, reacts with the carbonated water through the following reactions:

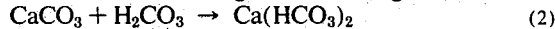

$$CaCO_3 + H_2CO_3 \rightarrow Ca(HCO_3)_2 \qquad (2)$$

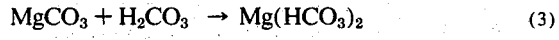

$$MgCO_3 + H_2CO_3 \rightarrow Mg(HCO_3)_2 \qquad (3)$$

Figure 2:
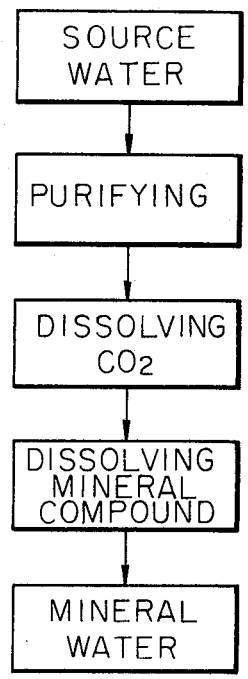

FIG. 2 illustrates another method of the invention which has the same steps as that of FIG. 1 except that this method includes purification step before the step of dissolving carbondioxide in the source water. This method is useful when usual service water or the like which contains unwanted impurities such as residual chlorine and, visible and invisible suspended matter is used. The water purification can be achieved by using active carbon filter or a usual water purifier.

Figure 3:
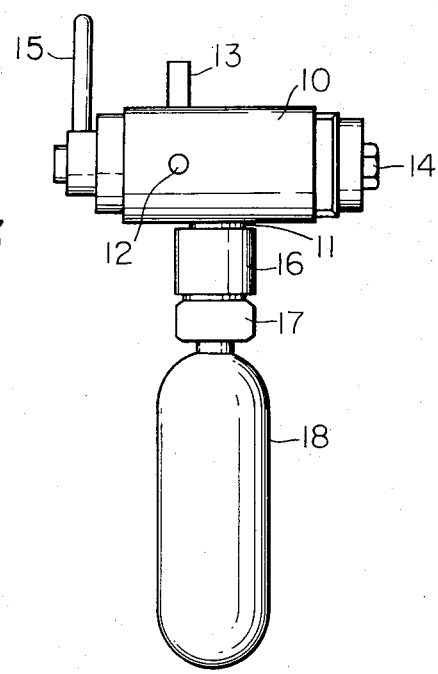
FIG. 3 is a schematic view of a device according to the invention for dissolving in water carbonic acid gas.

In FIG. 3, a carbonating element of an apparatus according to the invention is shown, which carbonating element comprises a body 10. The body 10 has a carbonic acid gas inlet 11, a starting water inlet 12, a carbonated water outlet 13, a carbonic acid gas pressure adjustment 14 and a lever 15. To the carbonic acid gas inlet inserted is a cap member 16 connected to an adapter 17 for receiving a carbon dioxide tank 18 containing pressurized and liquidified carbondioxide. The carbonating element is so arranged that the liquidified carbondioxide in the tank 18 is introduced through the carbonic acid gas inlet 11 into the body 10 when the lever 15 is rotated through a certain angle. The source water is, at the same time, introduced through the inlet 12 into the body and mixed with the carbonic acid gas from the tank 17 so that the source water is changed to carbonated water. The carbonated water then flows out through the outlet 13.

Figure 4:
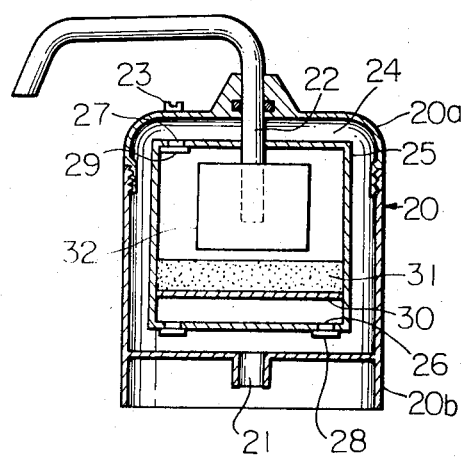
FIG. 4 is a sectional view of a device according to the invention for mixing mineral component with the carbonated water produced by the device of FIG. 3.

In FIG. 4, a mineral mixing element to be combined with the carbonating element of FIG. 3 is shown, which comprises a tank 20 having a carbonated water inlet 21. The inlet 21 is connected to the carbonated water inlet 13 of the carbonating element so that the carbonated water flows into the tank 20. An outlet pipe 22 is coupled with the tank 20 through an opening formed at the ceiling of the tank 20. An air relief aperture capped with a cap 23 is formed at the ceiling of the tank 20. A filtration element 24 of cartridge type is connected to the inner end of the outlet pipe 22 so that the filtration element 24 is suitably positioned within the tank 20. The filtration element 24 includes a housing 25 having an inlet 26 and an air relief opening 27 at the bottom and ceiling thereof. The inlet 26 may be sealed by a suitable member 28 such as a water-soluble adhesive tape so as to prevent unwanted substances from entering the housing 25 before operation. The air relief opening 27 is provided with a filter allowing air and water to pass therethrough but preventing powdered or granulous substance from passing therethrough. A perforated plate 30 divides the housing 25 into upper and lower compartments. A filtration layer 31 composed of granulous or powdered filtration material such as mineral carbonate is formed on the upper surface of the perforated plate 30. The filtration layer 30 may further include active carbon when the source water includes residual chlorine. A filtration cloth element 32 surrounds or envelopes the inner one end of the outlet pipe 22.

When the carbonated water from the carbonating element flows through the inlet 21 into the tank 20, the member 28 of the filtration element 24 is immersed in the carbonated water so that the member 28 dissolves in the carbonated water whereby the carbonated water enters through the inlet 26 the lower compartment of the housing 25. The carbonated water uniformly passes through the perforated plate 30 and the filtration layer 31. It is, in this instance, to be noted that carbonic acid gas which has not reacted with the source water stores in the form of bubles on the lower surface of the perforated plate 30 thereby causing the carbonation of the source water to sufficiently proceed. The upward flow of the carbonated water passed through the perforated plate 30 causes to stir the granules of the layer 31 with the result that small granules uniformly adheres on the outer surface of the filtration cloth element 32 because of filtration resistance of the cloth of the cloth element 32 and that relatively large granules, on the other hand, circulate in the housing 25 riding the turbulent flow of the water, whereby the carbonated water preferably rapidly and sufficiently reacts with the filtration compounds through such reactions as the reactions (2) and (3) and is changed to mineral water. The mineral water passes through the filtration cloth element 32 and flows out through the outlet pipe 22.

FIGS. 5 and 6 illustrate, in more detail, the carbonating element of FIG. 3. As shown, the body 10 generally includes a pillar-shaped central member 40, and first and second cap members 41 and 42 each coupled to each side end of the central member 40 by means of screw. These members 40, 41 and 42 may be integrally formed or otherwise formed, if desired. The central member 40 has at its side portion the carbonic acid gas inlet port 11 into which one end portion of the cap member 16 is screwed and seated through a sealing member 43 on the bottom of the inlet port 11. The cap member 16 has a bore longitudinally extending therethrough. A sealing member 44 is provided on the peripheral wall of the one end portion of the adapter 17. One end portion of the adapter 17 is inserted into the bore of the cap member 16 and screwed into the cap member 16. The adapter 17 has a bore extending therethrough. The outlet end of the tank 18 is screwed into the bore of the adapter 17 and hermetically sealed by a sealing member 45. A pin member 46 having a sharp end is fastened within the bore of the cap member 16. The pin member 16 is effective for destroy a plug of the outlet of the tank 18. In the central member 40 formed is an axially extending bore 47 which is divided into a reserve chamber 48 and a primary gas pressure adjusting chamber 49 by a valve seat 50. The reserve chamber 48 communicates through a filter 55 with the inlet port 11. The valve seat 50 having therein a bore which receives a valve element 51 and has at its bottom an opening 52. The valve element 51 is rightward biased through a spring seat 53 by a resilient member 54 provided within the reserve chamber 48 so as to shut the opening 52. The reserve chamber 48 communicates with the inlet port 11 by way of a filter 55. A sealing member 56 is provided at one end surface of the valve element 51 so that the valve element 51 can hermetically close the opening 52. A groove 57 is formed on the peripheral wall of the valve element 51. A push rod 58 is inserted into the opening 52 until one end of the push rod 58 abuts upon the valve element 51. A diaphragm 59 is hermetically fastened on the open end of the bore 47 by the first cap member 41 so as to define the primary pressure adjusting chamber 49. The first cap member 41 has therein a recess 60, having an aperture 60a, in which recess a resilient member 61 is accommodated, seating at its one end on a spring seat 62. The spring seat 62 faces the bottom of the recess 60 and engages with one end of the adjustment 14 screwed with the bottom wall of the cap member 41 and a lock nut 64. A diaphragm push member 65 is urged to the left by the resilient member 61 and therefore abuts with a head of the push rod 58 by way of the diaphragm 59. The second cap member 42 is screwed into a recess 66 formed at the other end of the central member 40. A guide member 67 is fixed and urged to the right by the cap member 42 so as to press an elastic valve sheet 68 composed of synthetic rubber and teflon (polyfluoroethylene fiber) sheets 68a and 68b onto the bottom of the recess 66. At the central portion of the bottom of the recess 66 formed in a small circular recess 69 communicating through a conduits 70 with an inlet port 71 of a secondary pressure regulator valve 72 having a valve element 73 screwed into a radially directed bore 74 communicating with the inlet port 71. The valve element 73 has a conical head 75 partially inserted into the inlet port 71 and defining a secondary pressure adjusting chamber 76. A lock nut 77 is coupled with the head portion of the valve element 73. An elastic sealing member 78 is provided with the valve element 73 so as to hermetically seal the chamber 76. The chamber 76 has an outlet port 79. At the bottom of the recess 66 formed are first, second and third annular grooves 80, 81 and 82 which are generally concentric with the recess 69. The first groove 80 communicates through a conduit 83 with the first pressure adjusting chamber 47. The second annular groove 81 communicates through a conduit 84 with the outlet port 77. The conduit 84 is, in FIG. 5, shown in broken lines in a way different from in FIG. 6 for the sake of compression. The second annular groove 81 communicates through a pair of conduits 85 and 85' with the outlet port 13 formed in the central member 40. The third annular groove 82 communicates through a pair of conduits 86 and 86' with the inlet 12. An actuating rod 87 is coupled with the cap member 42 and urged to the right by a resilient member 88 interposed between the cap member 42 and the rod 87. One end of the rod 87 is screwed with a hub 89 of the lever 15 and the other end is formed into a pressure ring 90 coupled with the guide member 67 for pressing the valve sheet 68 onto the bottom of the recess 66. A stopper 91 for stopping the rotation of the lever 15 is screwed into a side portion of the outer end of the cap member 42.

With the above-stated arrangement, the liquidified carbonic acid gas flows through the filter 55 in the reserve chamber 48. When the gaseous pressure in the chamber 49 remains relatively low, a leftward force exerted on the push rod 58 mainly caused by the resilient member 61 exceeds rightward force exerted on the push rod 58 caused by the resilient member 54 with the result that the push rod 58 slightly moved to the left to open the opening 52. At this instant, the carbonic acid gas in the chamber 48 flows through the groove 57 and a slit between the opening 52 and the push rod 58 into the chamber 49 so that the carbondioxide gasifies in the chamber 49 thereby to increase the gaseous pressure of the chamber 49. When the gaseous pressure in the chamber 49 reaches a predetermined level, the leftward and rightward forces exerted on the push rod 58 come in an equibrium, so that the push rod is restored to close the opening 52. Consequently, the gaseous pressure in the chamber 49 is maintained at a predetermined primary pressure. The primary pressure is regulated by adjusting the adjustment 14. The gasified carbonic acid gas in the chamber 49 is led through the conduit 83 to the first annular groove 80. The source water supplied to the inlet 12; on the other hand, flows through the conduits 86 and 86' into the third annular groove 82.

The lever 15 is initially rotated until the actuating rod 87 tightly presses the annular valve sheet 68 onto the bottom of the recess 66. The central recess 69 and first annular groove 80 are separated from each other by the valve sheet 68. The second and third annular grooves 81 and 82 are also separated from each other by the valve sheet 68.

When the lever 15 is rotated to attach the stopper 91, the actuating rod 87 moves to the left thereby allowing the pressurized carbonic acid gas in the groove 80 to flow beneath the valve sheet 68 into the central recess 69. The carbonic acid gas in the recess 69 is led through the conduit 70 to the inlet port 71 of the valve 72. The valve element 73 is adjusted to slightly open the inlet port 71 so as to allow the carbonic acid gas led to the inlet port 71 to pass through the inlet port at a desired rate whereby the gaseous pressure in the chamber 76 is maintained at a predetermined level. The carbonic acid in the chamber 76 flows through the conduit 84 in the second annular groove 81. Since, at this instant, the source water in the third annular groove 82 flows beneath the valve sheet 68 into the second annular groove 81, the source water are mixed with the carbonic acid gas in the second annular groove 81 and carbonated through the reaction (1). The carbonated water is delivered through the conduits 85 and 85' to the outlet port 13.

It is, in this instance, to be noted that the inner pressure in the tank 18 largely varies in dependence on the ambient temperature variation. When, for example, the inner pressure of the tank 18 is 30 kg/cm$^2$ at 0°C, the pressure becomes 120 kg/cm$^2$ at 35°C. The above-stated carbonating element according to the invention can, nevertheless, desiredly controls the gaseous pressure of the carbonic acid gas to be mixed with the source water since the carbonating element gasifies the pressurized or liquidified carbondioxide through two steps.

Furthermore, since the apparatus of the invention first carbonates the source water by the carbonating element and makes the carbonated water to rear with the mineral compounds, the resultant mineral water contains sufficient quantities of mineral components and has a composition substantially the same as that of the spring water.

In addition, it should be appreciated that since the apparatus of the invention is compact in construction and economical in cost, and controlled by simple operation, the apparatus can be favourably used for household use, marine use, polar-region use, etc.

EXAMPLE

A method according to the invention was carried out by the apparatus of the invention.

A service water containing 40 ppm of total hardness is American hardness was used for the source water. A mixture of 900 gram calcium carbonate powder and 100 gram active carbon powder was used for the filtration compound.

When the filtration cloth was 4,000 cm$^2$ and the source water of a water pressure of 1 kg/cm$^2$ was supplied at a pressure of 1 kg/cm$^2$, mineral water was obtained at a rate of 2 liters/minute. The resultant mineral water was 25 ppm in acidity, and 6.8 in pH.

When the pressure of the carbonic acid gas was changed the mineral component contained in the resultant mineral water was changed from 40 to 200 ppm of total hardness in American hardness. It is known that a desireble hardness of potable water is from 80 to 150 ppm.

Furthermore, the apparatus of the invention produced mineral water of a desired hardness when the apparatus was operated after such a long cessation as 16 hours.

What is claimed is:

1. An apparatus of producing mineral water, which comprises:
   first means for supplying source water;
   second means for supplying carbonic acid gas;
   third means mixing said source water with said carbonic acid gas so as to carbonate the source water; and
   fourth means for mixing the carbonated water with at least one kind of water-insoluble mineral compound containing a mineral component so that said source water changes to mineral water.

2. An apparatus as claimed in claim 1, in which said second means include fifth means for supplying pressurized carbonic acid gas; and sixth means for reducing the pressure of the carbonic acid gas to a predetermined pressure higher than the normal pressure.

3. An apparatus as claimed in claim 1, in which said sixth means includes a first pressure adjusting means for reducing the pressure of the supplied pressurized carbonic acid gas to a primary pressure and a second pressure adjusting means for further reducing the reduced pressure of the carbonic acid gas to a secondary pressure higher than the normal pressure.

4. An apparatus as claimed in claim 1, in which said fourth means includes a filter element consisting of a housing having an inlet at the bottom thereof and an outlet pipe passing through the ceiling thereof, a perforated plate dividing the housing into a lower compartment communicating with said inlet and an upper compartment communicating with the inner open end of said outlet pipe, granuluous substance disposed on the upper surface of said perforated plate and containing said mineral compound, and a filtration cloth enclosing said inner end of the outlet pipe.

* * * * *